US009896332B2

(12) United States Patent
Hikazudani et al.

(10) Patent No.: US 9,896,332 B2
(45) Date of Patent: Feb. 20, 2018

(54) AMMONIA OXIDATION/DECOMPOSITION CATALYST

(71) Applicant: Hitachi Zosen Corporation, Osaka-shi (JP)

(72) Inventors: Susumu Hikazudani, Osaka (JP); Takuma Mori, Osaka (JP); Sadao Araki, Osaka (JP)

(73) Assignee: Hitachi Zosen Corporation, Osaka-shi (JP)

( * ) Notice: Subject to any disclaimer, the term of this patent is extended or adjusted under 35 U.S.C. 154(b) by 0 days.

(21) Appl. No.: 15/047,797

(22) Filed: Feb. 19, 2016

(65) Prior Publication Data

US 2016/0167962 A1  Jun. 16, 2016

Related U.S. Application Data

(63) Continuation of application No. 13/883,302, filed as application No. PCT/JP2011/075775 on Nov. 9, 2011, now abandoned.

(30) Foreign Application Priority Data

Nov. 9, 2010  (JP) .................................. 2010-250538

(51) Int. Cl.
*B01J 21/00* (2006.01)
*B01J 23/00* (2006.01)
(Continued)

(52) U.S. Cl.
CPC .............. *C01B 3/047* (2013.01); *B01J 23/28* (2013.01); *B01J 23/34* (2013.01); *B01J 23/63* (2013.01);
(Continued)

(58) Field of Classification Search
USPC ......................................... 502/100, 300, 304
See application file for complete search history.

(56) References Cited

U.S. PATENT DOCUMENTS 5,108,730 A  4/1992  Lee et al.
6,827,917 B1  12/2004  Ward et al.
(Continued)

FOREIGN PATENT DOCUMENTS

EP  2332646 A1  6/2011
EP  2409761 A1  1/2012
(Continued)

OTHER PUBLICATIONS

International Search Report dated Feb. 14, 2012, issued for PCT/JP2011/075775.
(Continued)

*Primary Examiner* — James McDonough
(74) *Attorney, Agent, or Firm* — Locke Lord LLP

(57) ABSTRACT

Provided is an ammonia oxidation/decomposition catalyst which can decrease the reduction temperature of a support, which is required for the catalyst to have a property of being activated at room temperature, and also can render a property of being activated at a temperature lower than room temperature. The ammonia oxidation/decomposition catalyst of the present invention is an ammonia oxidation/decomposition catalyst, comprising: a catalyst support composed of a composite oxide of cerium oxide and zirconium oxide; and at least one metal selected from the group consisting of metals of group 6A, group 7A, group 8, and group 1B as a catalytically active metal deposited thereon, characterized in that the molar concentration of zirconium oxide in the catalyst support is from 10 to 90%.

5 Claims, 1 Drawing Sheet

(51) Int. Cl.
*B01J 25/00* (2006.01)
*B01J 29/00* (2006.01)
*B01J 23/10* (2006.01)
*C01B 3/04* (2006.01)
*H01M 8/0606* (2016.01)
*B01J 23/28* (2006.01)
*B01J 23/34* (2006.01)
*B01J 23/63* (2006.01)
*B01J 23/83* (2006.01)
*B01J 37/03* (2006.01)
*B01J 37/18* (2006.01)
*B01J 35/04* (2006.01)
*B01J 37/00* (2006.01)
*B01J 37/02* (2006.01)
*H01M 8/22* (2006.01)

(52) U.S. Cl.
CPC ............... *B01J 23/83* (2013.01); *B01J 35/04* (2013.01); *B01J 37/0009* (2013.01); *B01J 37/0201* (2013.01); *B01J 37/038* (2013.01); *B01J 37/18* (2013.01); *H01M 8/0606* (2013.01); *H01M 8/222* (2013.01); *Y02E 60/364* (2013.01)

(56) References Cited

U.S. PATENT DOCUMENTS

| | | | |
|---|---|---|---|
| 2005/0095188 A1 | 5/2005 | Matsumoto et al. | |
| 2010/0107188 A1* | 4/2010 | van Hoff | G11B 27/034 725/32 |
| 2010/0130350 A1 | 5/2010 | Machida et al. | |
| 2010/0221160 A1* | 9/2010 | Adib | B01D 53/9418 423/213.2 |
| 2010/0247409 A1* | 9/2010 | Collier | B01D 53/9418 423/213.2 |
| 2013/0156687 A1* | 6/2013 | Araki | B01J 23/002 423/658.2 |

FOREIGN PATENT DOCUMENTS

| | | |
|---|---|---|
| EP | 2554257 A1 | 2/2013 |
| EP | 2612706 A1 | 7/2013 |
| JP | 63-72344 A | 4/1988 |
| JP | 09-271637 A | 10/1997 |
| JP | 2007-504945 A | 3/2007 |
| JP | 4165661 B2 | 10/2008 |
| JP | 2010-531227 A | 9/2010 |
| JP | 2010-269239 A | 12/2010 |
| WO | WO-2005/025724 A1 | 3/2005 |
| WO | 2010/032790 A1 | 3/2010 |
| WO | 2010/107065 A1 | 9/2010 |
| WO | 2011/125653 A1 | 10/2011 |

OTHER PUBLICATIONS

Communication pursuant to Article 94(3) EPC dated Jul. 12, 2016, issued for the corresponding EP patent application No. 11 839 746.2.

* cited by examiner

AMMONIA OXIDATION/DECOMPOSITION CATALYST

This application is a continuation application of U.S. application Ser. No. 13/883,302, filed May 3, 2013 which claims the right of priority under 35 U.S.C. § 119 based on Japanese Patent Application No. 2010-250538 filed Nov. 9, 2010.

TECHNICAL FIELD

The present invention relates to an ammonia oxidation/decomposition catalyst which is used in a combustion improver for an ammonia engine using ammonia as a fuel or in a hydrogen production reaction in a fuel cell, etc.

BACKGROUND ART

Conventionally, in order to produce hydrogen by decomposing ammonia, it is necessary to allow a reaction of the following formula (I) to proceed in the presence of a ruthenium-based ammonia decomposition catalyst.

$$\Delta H_{298K} = 46.1 \text{ kJ/mol}$$

Since the reaction of the formula (I) is an endothermic reaction, in order to obtain a stable ammonia decomposition ratio, it is necessary to provide heat to a reaction system and set the reaction temperature to 350° C. or higher.

Therefore, in order to suppress a decrease in gas temperature due to the endothermic reaction, heat is supplied from the outside conventionally. However, by this method, the heat transfer rate is lower than the reaction rate, and therefore, in order to obtain a sufficient heat transfer rate, there is no other choice but to increase a heat transfer area and it is difficult to decrease the size of an apparatus.

A method in which exhaust gas of an engine or the like is used as a heat source for supplying heat from the outside is also contemplated, however, this method has a drawback that, in the case where the temperature of the heat source is 350° C. or lower, since the temperature of the heat source is lower than the temperature at which a catalyst works, and therefore, heat cannot be supplied and a predetermined amount of hydrogen cannot be produced.

As the heat source for supplying heat, other than the supply from the outside, there is a method in which as shown in the following formula (II), heat is generated by a catalytic reaction between ammonia and oxygen, and the generated heat is used.

$$\Delta H_{298K} = -315.1 \text{ kJ/mol}$$

When the reaction of the formula (I) and the reaction of the formula (II) are caused in the same reaction tube, the heat absorbed by the reaction of the formula (I) can be supplemented with the heat generated by the reaction of the formula (II). Further, the temperature of a catalyst layer can be controlled by controlling the amount of oxygen in the formula (II). For example, in the case where the temperature of the supply gas preheated by waste heat of engine exhaust gas through heat exchange varies, hydrogen can be stably produced.

As an ammonia oxidation catalyst to be used for allowing the reaction of the formula (II) to proceed, a platinum-based catalyst is generally used. For example, in Patent Literature 1, a multilayer ammonia oxidation catalyst containing a refractory metal oxide, a platinum layer provided on this refractory metal oxide, and a vanadia layer provided on the platinum is proposed.

However, the operating temperature of the catalyst is about 200° C., and the oxidation reaction cannot be allowed to proceed at a temperature of about 200° C. or lower, and therefore, it is necessary to increase the gas temperature to about 200° C. with an electric heater or the like.

In Patent Literature 2, an ammonia oxidation catalyst containing an oxide of at least one element selected from cerium and praseodymium, an oxide of at least one element selected from non-variable valency rare earth elements including yttrium, and cobalt oxide is proposed, and in Patent Literature 3, an ammonia oxidation catalyst, which contains filaments composed essentially of platinum, rhodium, and optionally palladium, and in which the filaments have a platinum coating is proposed. However, these catalysts also have the same problem as in Patent Literature 1.

PTL 1: JP-T-2007-504945, the term "JP-T" as used herein means a published Japanese translation of a PCT patent application PTL 2: Japanese Patent No. 4,165,661

PTL 3: JP-A-63-72344

SUMMARY OF INVENTION

Technical Problem

The present inventors of this application developed an ammonia oxidation/decomposition catalyst obtained by depositing a catalytically active metal on a support composed of a metal oxide which can undergo a redox reaction.

According to this ammonia oxidation/decomposition catalyst, (i) by bringing ammonia and air into contact with this catalyst at room temperature, first, the support in a reduced state is reacted with oxygen to generate oxidation heat, and the temperature of a catalyst layer is instantaneously increased and reaches a temperature at which ammonia and oxygen are reacted with each other; and (ii) thereafter, an ammonia oxidation reaction which is an exothermic reaction proceeds spontaneously, and heat generated by the exothermic reaction is used in the process of decomposing ammonia in the presence of the catalytically active metal according to the above formula (I), whereby hydrogen is produced.

Therefore, by using the above catalyst, preheating with an electric heater or the like is no longer required, and therefore, the hydrogen production cost can be reduced.

By reducing the support in advance, the support in a reduced state is reacted with oxygen to generate oxidation heat when oxygen comes into contact with the support at room temperature, whereby the above catalyst has a property of being activated at room temperature.

In the case of using $CeO_2$ alone as a support, in order to render a property of being activated at room temperature, it was necessary to reduce the support at a high temperature of 600° C. or higher.

Moreover, although the above catalyst has a property of being activated at room temperature, a property of being activated at a temperature lower than room temperature could not be exhibited. If the catalyst can be activated at a temperature even lower than room temperature, the range of application of the catalyst can be widened, and therefore such a catalyst is convenient.

The invention has been made in view of the above circumstances, and an object of the invention is to provide an ammonia oxidation/decomposition catalyst which can decrease the reduction temperature of a support, which is required for the catalyst to have a property of being activated, and also can render a property of being activated at a temperature lower than room temperature.

Solution to Problem

In order to achieve the above object, the ammonia oxidation/decomposition catalyst of the invention is an ammonia oxidation/decomposition catalyst, containing: a catalyst support composed of a composite oxide of cerium oxide and zirconium oxide; and at least one metal selected from the group consisting of metals of group 6A, group 7A, group 8, and group 1B as a catalytically active metal deposited thereon, and is characterized in that the molar concentration of zirconium oxide in the catalyst support is from 10 to 90%.

Preferably, the ammonia oxidation/decomposition catalyst is in a honeycomb form.

Preferably, the ammonia oxidation/decomposition catalyst is in a pellet or raschig ring form.

The catalyst support which can undergo a redox reaction and is used in the ammonia oxidation/decomposition catalyst of the present invention is composed of a composite oxide of cerium oxide and zirconium oxide, and the molar concentration of zirconium oxide in the catalyst support is from 10 to 90%, more preferably from 20 to 70%.

The catalytically active metal to be deposited on the catalyst support is preferably at least one metal selected from the group consisting of metals of group 6A such as Mo and Cr, metals of group 7A such as Mn, metals of group 8 such as Ru, Pt, Rh, Pd, Co, Ni, and Fe, and metals of group 1B such as Cu and Ag.

In the ammonia oxidation/decomposition catalyst according to the present invention, a part of or the whole of the metal oxide constituting the catalyst support is reduced by the following reaction by performing a heating treatment at 200 to 400° C. in a hydrogen stream or in an ammonia stream.

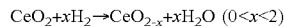
$CeO_2 + xH_2 \rightarrow CeO_{2-x} + xH_2O$ (0<x<2)

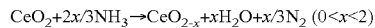
$CeO_2 + 2x/3NH_3 \rightarrow CeO_{2-x} + xH_2O + x/3N_2$ (0<x<2)

The catalyst after undergoing the above reduction is used in an ammonia oxidation/decomposition reaction. The reduction treatment of the ammonia oxidation/decomposition catalyst may be performed either before or after loading the catalyst in a catalyst reactor.

When the ammonia oxidation/decomposition catalyst in a state in which the catalyst support is reduced is brought into contact with ammonia and air at room temperature or a temperature between −30 and −15° C., which is equal to or lower than room temperature, first, the catalyst support in a reduced state is reacted with oxygen to generate oxidation heat, and the temperature of the catalyst layer is instantaneously increased. Once the temperature of the catalyst layer is increased to a temperature (200° C.) at which ammonia and oxygen are reacted with each other, thereafter an ammonia oxidation reaction proceeds spontaneously according to the above formula (II). Heat generated by the exothermic reaction of the formula (II) is used in the process of decomposing ammonia in the presence of the catalytically active metal according to the above formula (I), whereby hydrogen is produced.

Advantageous Effects of Invention

According to the present invention, in an ammonia oxidation/decomposition catalyst obtained by depositing at least one metal selected from the group consisting of metals of group 6A, group 7A, group 8, and group 1B as a catalytically active metal, by using a catalyst support composed of a composite oxide of cerium oxide and zirconium oxide, and setting the molar concentration of zirconium oxide in the catalyst support to 10 to 90%, a decrease in the reduction temperature of the support, which is required for the catalyst to have a property of being activated, can be achieved, and also a property of being activated at a temperature lower than room temperature can be rendered.

DESCRIPTION OF EMBODIMENTS

Figure 1:
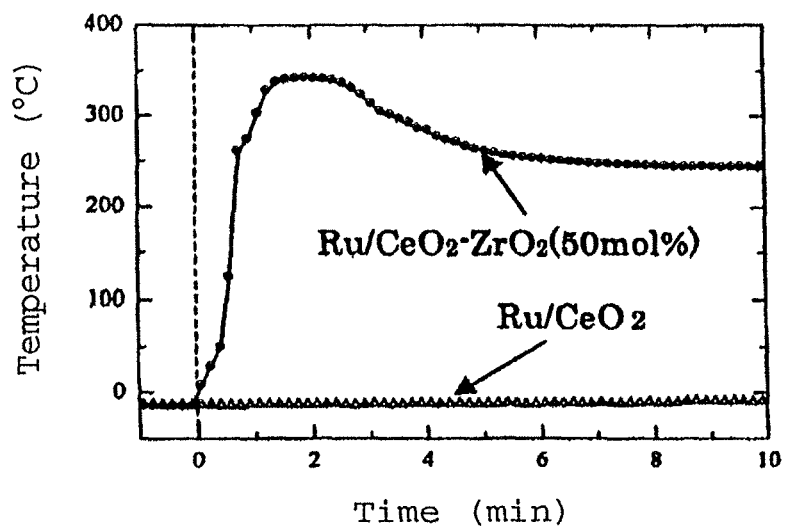
FIG. 1 is a graph showing a change over time of the temperature of a catalyst layer when a test for a property of being activated at a low temperature was performed.

Hereinafter, several Examples of the present invention and Comparative Examples for comparison therewith will be described for specifically illustrating the present invention.

a) Catalyst Support

As the catalyst support, four types of commercially available $CeO_2$—$ZrO_2$ (manufactured by DAIICHI KIGENSO KAGAKU KOGYO Co., LTD.) in which the molar concentration of $ZrO_2$ is 10, 20, 50, and 80% were used.

b) Deposition of Catalytically Active Metal

A catalytically active metal was deposited on each of the above catalyst supports. As the catalytically active metal, Ru, Pt, Rh, and Pt—Rh, which are noble metals, and Co, Ni, Fe, Cu, Mo, and Mn, which are base metals, were used. The catalyst deposition amount was set to 2% by weight in all cases.

(Preparation of Pellet Catalyst)

The deposition of each of the above metals on the catalyst support was performed as follows. Each of the metal salts, which are precursors of the respective metals, was dissolved in pure water, to which the above catalyst support was immersed so as to make the metals dispersed on the supports such that the deposition amount of the catalytically active metal was 2% by weight (in terms of metal).

This dispersion was heated to gradually evaporate water (an evaporation to dryness method).

The obtained powdery substance was calcinated in air at 300° C. for 3 hours.

The powdery substance after firing was compression molded and the resulting molded product was sieved to 1 to 0.85 mm and used.

(Preparation of Honeycomb Catalyst)

The catalytically active metal was deposited on 600 cpi cordierite by a wash-coating method until the catalyst deposition amount reached about 250 g/L.

As the catalyst support for Comparative Examples, commercially available $CeO_2$ (manufactured by DAIICHI KIGENSO KAGAKU KOGYO Co., LTD.) was used. On this catalyst support, each of the catalytically active metals, Ru, Co, and Ni, were deposited. The catalyst deposition amount was set to 2% by weight.

c) Test for Property of being Activated at Room Temperature (Reduction Treatment of Catalyst)

After each of the obtained pellet catalysts (1 g) and the honeycomb catalysts (4 mL) was loaded in a flow-through type reaction tube, several reduction treatments were performed at different temperatures to each treatment in a hydrogen stream. Each of temperatures of the reduction treatment was a range from 150° C. to 800° C. and each had 50° C. intervals. The reduction times for each treatment were set to 2 hours.

(Validation of Property of being Activated at Room Temperature)

The above catalyst loaded in the reaction tube and undergoing the reduction treatment at each temperature was kept at 25° C. in a nitrogen atmosphere, and thereafter, oxygen (air) and ammonia were simultaneously supplied to the catalyst layer. The ammonia supplying amount was kept constant at 2.5 NL/min, and the air supplying amount was set such that the volume ratio of air to ammonia was 1.0. The temperature of the catalyst layer and the gas composition at the outlet were measured by a thermocouple and a mass spectrometer, respectively.

From the above results, a catalyst that satisfied the following three requirements: the temperature of the catalyst layer was increased; the production of hydrogen was observed; and hydrogen was stably produced for 30 minutes or more was determined as a catalyst that exhibits a property of being activated at room temperature, and with respect to such a catalyst, the temperature required for the reduction treatment was determined as the reduction temperature.

The form and the composition of each of the catalysts of Examples and Comparative Examples and the reduction temperature thereof are shown in the following Table 1.

TABLE 1

|  | Form | Composition | Reduction temperature |
|---|---|---|---|
| Example |  |  |  |
| 1 | Pellet | Ru/$CeO_2$—$ZrO_2$ (10 mol %) | 400° C. |
| 2 | Pellet | Ru/$CeO_2$—$ZrO_2$ (20 mol %) | 250° C. |
| 3 | Pellet | Ru/$CeO_2$—$ZrO_2$ (50 mol %) | 200° C. |
| 4 | Pellet | Ru/$CeO_2$—$ZrO_2$ (80 mol %) | 200° C. |
| 5 | Pellet | Pt/$CeO_2$—$ZrO_2$ (50 mol %) | 200° C. |
| 6 | Pellet | Rh/$CeO_2$—$ZrO_2$ (50 mol %) | 200° C. |
| 7 | Pellet | Pt—Rh/$CeO_2$—$ZrO_2$ (50 mol %) | 200° C. |
| 8 | Pellet | Co/$CeO_2$—$ZrO_2$ (50 mol %) | 300° C. |
| 9 | Pellet | Fe/$CeO_2$—$ZrO_2$ (50 mol %) | 300° C. |
| 10 | Pellet | Ni/$CeO_2$—$ZrO_2$ (50 mol %) | 300° C. |
| 11 | Pellet | Cu/$CeO_2$—$ZrO_2$ (50 mol %) | 350° C. |
| 12 | Pellet | Mo/$CeO_2$—$ZrO_2$ (50 mol %) | 400° C. |
| 13 | Pellet | Mn/$CeO_2$—$ZrO_2$ (50 mol %) | 400° C. |
| 14 | Honeycomb | Ru/$CeO_2$—$ZrO_2$ (50 mol %) | 200° C. |

TABLE 1-continued

|  | Form | Composition | Reduction temperature |
|---|---|---|---|
| Comparative Example |  |  |  |
| 1 | Pellet | Ru (2 wt %)/$CeO_2$ | 600° C. |
| 2 | Pellet | Co (2 wt %)/$CeO_2$ | 600° C. |
| 3 | Pellet | Ni (2 wt %)/$CeO_2$ | 700° C. |

As apparent from the above Table 1, in the case where the catalyst support was $CeO_2$ (Comparative Examples 1 to 3), in order to exhibit a property of being activated at room temperature, it was necessary to set the reduction temperature to 600° C. or higher, while, in the case where Zr was added at 10 mol % to $CeO_2$ (Example 1), the reduction temperature for exhibiting a property of being activated at room temperature was 400° C., and therefore, the reduction temperature could be decreased by 200° C. as compared with Comparative Example 1.

It was confirmed that in the case where ammonia oxidation/decomposition proceeded and the temperature of the catalyst layer was increased to 600° C. or higher, when the reaction was stopped, merely by blowing ammonia into the catalyst layer, the temperature of the catalyst layer was increased by the progress of the oxidation reaction (which is an exothermic reaction) with the supported catalyst, and a property of being activated at room temperature was exhibited again. Accordingly, reactivation could be achieved under a milder condition.

From the above results, the molar concentration of Zr added was desirably from 20 to 70 mol %, and in the case where Ru, which is a noble metal, was used as the catalytically active metal, a property of being activated at room temperature could be exhibited when the reduction temperature was 200° C., and in the case where Ni or Co, which is a base metal, was used as the catalytically active metal, a property of being activated at room temperature could be exhibited when the reduction temperature was 300° C.

d) Test for Property of being Activated at Low Temperature (Reduction Treatment of Catalyst)

After each of the obtained pellet catalysts (1 g) and the honeycomb catalysts (4 mL) was loaded in a flow-through type reaction tube, a reduction treatment was performed in a hydrogen stream at 600° C. for 2 hours.

(Validation of Property of being Activated at Low Temperature)

The above catalyst loaded in the reaction tube and undergoing the reduction treatment was cooled in a nitrogen atmosphere, and after the temperature was reached a predetermined temperature, oxygen (air) and ammonia were simultaneously supplied thereto. The ammonia supplying amount was kept constant at 1 NL/min, and the air supplying amount was set such that the volume ratio of air to ammonia was 1.0. The temperature of the catalyst layer and the hydrogen generation amount at the outlet of the catalyst layer were measured by a thermocouple and a mass spectrometer, respectively.

The form and the composition of each of the catalysts of Examples and Comparative Example are shown in the following Table 2.

TABLE 2

| | Form | Composition | Initial temperature of catalyst layer | Ammonia decomposition ratio (%) |
|---|---|---|---|---|
| Example | | | | |
| 15 | Pellet | Ru/CeO$_2$—ZrO$_2$ (10 mol %) | −15° C. | 41 |
| 16 | Pellet | Ru/CeO$_2$—ZrO$_2$ (20 mol %) | −15° C. | 40 |
| 17 | Pellet | Ru/CeO$_2$—ZrO$_2$ (50 mol %) | −15° C. | 36 |
| 18 | Pellet | Ru/CeO$_2$—ZrO$_2$ (70 mol %) | −15° C. | 33 |
| 19 | Pellet | Ru/CeO$_2$—ZrO$_2$ (90 mol %) | −15° C. | 35 |
| 20 | Pellet | Rh/CeO$_2$—ZrO$_2$ (50 mol %) | −15° C. | 37 |
| 21 | Pellet | Pt/CeO$_2$—ZrO$_2$ (50 mol %) | −15° C. | 39 |
| 22 | Pellet | Pt—Rh/CeO$_2$—ZrO$_2$ (50 mol %) | −15° C. | 42 |
| 23 | Pellet | Co/CeO$_2$—ZrO$_2$ (50 mol %) | −15° C. | 33 |
| 24 | Pellet | Fe/CeO$_2$—ZrO$_2$ (50 mol %) | −15° C. | 32 |
| 25 | Pellet | Ni/CeO$_2$—ZrO$_2$ (50 mol %) | −15° C. | 35 |
| 26 | Pellet | Cu/CeO$_2$—ZrO$_2$ (50 mol %) | −15° C. | 20 |
| 27 | Pellet | Mo/CeO$_2$—ZrO$_2$ (50 mol %) | −15° C. | 28 |
| 28 | Pellet | Mn/CeO$_2$—ZrO$_2$ (50 mol %) | −15° C. | 29 |
| 29 | Pellet | Ru/CeO$_2$—ZrO$_2$ (50 mol %) | −25° C. | 32 |
| 30 | Pellet | Ru/CeO$_2$—ZrO$_2$ (50 mol %) | −30° C. | 30 |
| 31 | Pellet | Co/CeO$_2$—ZrO$_2$ (50 mol %) | −30° C. | 25 |
| 32 | Honeycomb | Ru/CeO$_2$—ZrO$_2$ (50 mol %) | −30° C. | 33 |
| Comparative Example | | | | |
| 4 | Pellet | Ru (2 wt %)/CeO$_2$ | −15° C. | 0 |

A change with time of the temperature of the catalyst layer when performing the above test for a property of being activated at a low temperature is shown in FIG. 1 for each of the case where the catalyst (Ru/CeO$_2$—ZrO$_2$ (50 mol %)) of Example 17 was used and the case where the catalyst (Ru (2 wt %)/CeO$_2$) of Comparative Example 4 was used.

Figure 2:
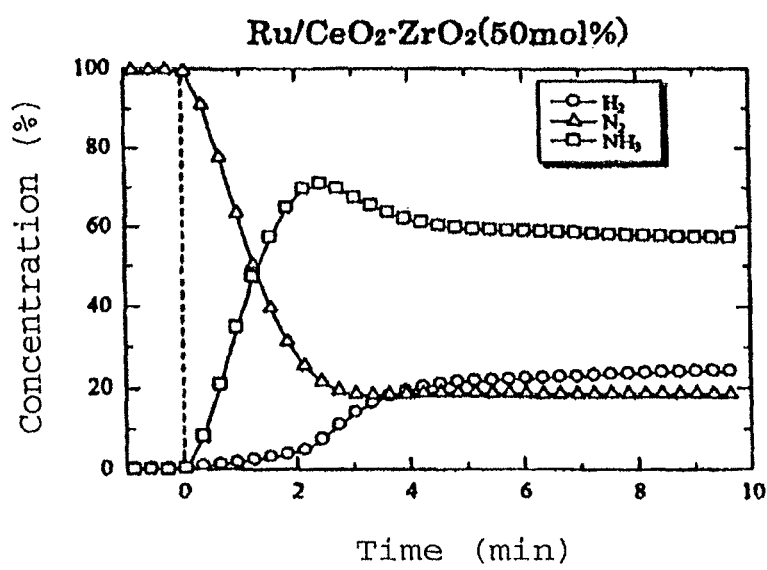
FIG. 2 is a graph showing a change over time of the concentration of each gas when a catalyst of Example 17 was used.

Further, a change with time of the concentration of each gas when the catalyst of Example 17 was used is shown in FIG. 2.

As apparent from FIG. 1, in the case of Comparative Example 1 in which the catalyst support was CeO$_2$, a property of being activated was not exhibited when the initial temperature of the catalyst layer was −15° C.

On the other hand, in the case of Examples 15 to 32, by adding ZrO$_2$ to CeO$_2$ at 10 to 90 mol %, desirably at 20 to 70 mol %, it was found that a property of being activated was exhibited even at a temperature lower than room temperature.

In particular, regardless of the types of metals, i.e., noble metals such as Pt, Rh, and a Pt—Rh alloy, and base metals such as Co, Fe, Ni, Cu, Mo, and Mn, a property of being activated at a low temperature could be exhibited.

The invention claimed is:

1. A method for activating an ammonia oxidation/decomposition catalyst comprising:
   providing the ammonia oxidation/decomposition catalyst comprising a catalyst support composed of composite oxide of cerium oxide and zirconium oxide and a catalytically active metal deposited thereon, wherein the molar concentration of zirconium oxide in the catalyst support is from 10 to 90%;
   heating the catalyst at 200 to 400° C. in a hydrogen stream or in an ammonia stream in order to reduce a part of or the whole of the cerium oxide constituting the catalyst support to
   CeO$_{2-x}$ (0<x<2); and
   then supplying oxygen and ammonia simultaneously to the catalyst at a temperature between room temperature and −30° C. in order to generate oxidation heat by the reaction of the catalyst support in a reduced state with oxygen such that the temperature of the catalyst layer is increased to a temperature at which ammonia and oxygen are reacted with each other.

2. The method according to claim 1, wherein the catalyst support is in a honeycomb form.

3. The method according to claim 1, wherein the catalyst support is in a pellet form.

4. The method according to claim 1, wherein the molar concentration of the zirconium oxide in the catalyst support is from 20% to 70%.

5. The method according to claim 1, wherein the catalytically active metals is at least one metal selected from the group consisting of metals from groups 6A, 7A, 8 and 1B.

* * * * *